(12) United States Patent
Jacob et al.

(10) Patent No.: US 8,557,039 B2
(45) Date of Patent: Oct. 15, 2013

(54) METHOD FOR MANUFACTURING A SULFOALUMINOUS OR BELITIC SULFOALUMINOUS CLINKER, AND CORRESPONDING EQUIPMENT

(75) Inventors: Yvan-Pierre Jacob, le Pont de Beauvoisin (FR); Jacques Croce, Saint Laurent du Pont (FR); Guy Beauvent, Wierre Effroy (FR); René De La Fouchardiere, Nimes (FR); Dominique Renie, Coublevie (FR)

(73) Assignee: VICAT (FR)

( * ) Notice: Subject to any disclaimer, the term of this patent is extended or adjusted under 35 U.S.C. 154(b) by 293 days.

(21) Appl. No.: 12/922,499

(22) PCT Filed: Mar. 12, 2009

(86) PCT No.: PCT/FR2009/050411
§ 371 (c)(1),
(2), (4) Date: Dec. 6, 2010

(87) PCT Pub. No.: WO2009/122065
PCT Pub. Date: Oct. 8, 2009

(65) Prior Publication Data
US 2011/0073013 A1 Mar. 31, 2011

(30) Foreign Application Priority Data
Mar. 14, 2008 (FR) .................................. 08 01414

(51) Int. Cl.
*C04B 7/40* (2006.01)
(52) U.S. Cl.
USPC .......................................... 106/739; 106/753
(58) Field of Classification Search
USPC ................................................ 106/739, 751
See application file for complete search history.

(56) References Cited

U.S. PATENT DOCUMENTS 3,954,391 A * 5/1976 Gottlieb ........................... 432/14
4,367,095 A * 1/1983 Namy ............................. 106/743

(Continued)

FOREIGN PATENT DOCUMENTS

| DE | 2405413 A1 | 8/1975 |
| EP | 1260489 A1 | 11/2002 |
| FR | 1253566 | 2/1961 |
| FR | 2873366 | 1/2006 |

(Continued)

OTHER PUBLICATIONS

International Search Report PCT/FR2009/050411; Dated Nov. 11, 2009.

*Primary Examiner* — Paul Marcantoni
(74) *Attorney, Agent, or Firm* — Cantor Colburn LLP

(57) ABSTRACT

The invention relates to a method for manufacturing a sulfoaluminous or belitic sulfoaluminous clinker from a raw mix formed from a mixture including minerals containing calcium, aluminum, silica, iron, and sulfur, preferably in sulfate form, and is characterized in that the method comprises the steps including: at least partially dehydrating and decarbonating the mixture through placement in a vertical kiln (1) comprising a substantially vertical chamber (2) wherein the mixture is heated, the chamber (2) of the vertical kiln (1) being supplied with hot gases the temperature of which is between 900 and 1150° C.; extracting the dehydrated and decarbonated mixture from the vertical kiln (1) and conveying the same in a continuous kiln (4) comprising a furnace (5) and a transporting means (6) for transporting the mixture across the furnace (5); heating the mixture from the vertical kiln (1) by passing the mixture through the furnace (5) via the transporting means (6) such that a clinkerization of the mixture is obtained, the average passage time in the furnace being greater than 15 minutes.

11 Claims, 6 Drawing Sheets

(56) References Cited

U.S. PATENT DOCUMENTS

| | | |
|---|---|---|
| 5,188,668 A | 2/1993 | Litka |
| 6,599,123 B2 * | 7/2003 | Ramirez-Tobias et al. ..... 432/14 |
| 2003/0108842 A1 * | 6/2003 | Ramirez-Tobias et al. ..... 432/15 |

FOREIGN PATENT DOCUMENTS

| | | |
|---|---|---|
| GB | 358621 | 10/1931 |
| GB | 624032 | 5/1949 |
| WO | 02094932 | 11/2002 |

* cited by examiner

METHOD FOR MANUFACTURING A SULFOALUMINOUS OR BELITIC SULFOALUMINOUS CLINKER, AND CORRESPONDING EQUIPMENT

TECHNICAL FIELD

The invention concerns a method for manufacturing a sulfoaluminous or belitic sulfoaluminous clinker, and corresponding equipment.

BACKGROUND

The manufacture of hydraulic binders, and in particular of cements, consists essentially of a calcination of a mixture of carefully chosen and assayed raw materials also referred to as "raw mix." The firing of this raw mix yields an intermediate product, the clinker, which, shredded with possible mineral additions, will yield cement. The type of cement manufactured depends on the nature and proportions of the raw materials as well as the firing method. There are several types of cements: Portland cements (which make up the great majority of cements produced in the world), aluminous (or calcium aluminate) cements, natural quick setting cements, sulfoaluminous cements, belitic sulfoaluminous cements, and other intermediate varieties. Since these families are not totally disconnected, it is preferable to describe them by their chemical and mineralogical components.

In the world of cement, it is common to use a specific notation to describe the components of a clinker or cement. Since the clinker is the result of a high-temperature calcination, the elements are essentially present in oxide form.

Regardless of the type of cement, a person skilled in the art will always be faced, during its manufacture, with a dual aim: ensuring the chemical stability of the mixture of raw materials and the heat stability of the method. Indeed, since the performance expected from the cement depends on the quantity and nature of the mineralogical phases synthesized during firing, it is crucial for the raw mix to contain the elements necessary for that synthesis and for the heat conditions of the method to lend themselves to the appearance and conservation of said phases. However, this dual requirement is not always easy to respect, since the chemistry of the raw mix influences how the method is conducted and the mineralogy of the cement depends on how the method is conducted. These difficulties have been largely empirically resolved through a slow evolution of the manufacture method for Portland cements. However, although the most recent industrial equipment meets the needs of large-scale production of Portland cements, it does not make it possible to separate the respective influences of the chemistry and conduct of the method.

BRIEF SUMMARY

The invention proposes in particular to resolve this drawback.

More particularly, the invention concerns a method for manufacturing a sulfoaluminous or belitic sulfoaluminous clinker from a raw mix formed by a mixture of minerals containing calcium, aluminum, silica, iron, and sulfur, preferably in sulfate form.

The present invention also has an advantage related to the firing of marls to manufacture natural quick setting cements.

The most widespread cements are Portland cements. Portland cements are obtained from Portland clinker, obtained after clinkerization at a temperature in the vicinity of 1450° C. of a raw mix in a kiln.

Sulfoaluminous and belitic sulfoaluminous cements release less $CO_2$ than Portland cements.

A first method for producing Portland clinker consists of using long rotary kilns capable of ensuring the drying, balling, preheating, decarbonatation, then clinkerization.

Using a rotary kiln does not make it possible to master the temperature. Indeed, significant temperature variations may appear in the kiln during firing of the raw mix.

Yet, in the case of the production of a sulfoaluminous or sulfobelitic clinker, it is necessary not to exceed a critical temperature, so as to avoid the appearance of undesired phases.

Thus for example, beyond 1350° C., the $C_4A_3\bar{S}$ phase disappears during the firing of the raw mix and the undesired $C_{12}A_7$ phase appears. Moreover, such a temperature causes the appearance of SOx, discharged in the fumes and forming a pollutant.

A second method, developed historically after the first, consists of drying the fired material in dryer mills or in rotary dryers with recovery of the fumes to obtain a raw filler that is sent into a cyclone tower called a cyclone exchanger, the temperature at the bottom of the tower being in the vicinity of 800 to 850° C. This filler is then introduced into a rotary kiln in which it successively undergoes the granulation, decarbonatation and clinkerization steps.

In order to meet the cost reduction and maintenance constraints, it is necessary to even further reduce the length of the rotary kiln used. To do this, a third clinker production method was developed, consisting of adding a precalcination stage situated at the foot of the cyclone tower and providing energy necessary for the decarbonatation, part of the air intended to cool the clinker and thus heated by it being used to improve the heat balance.

In this way, the height of the tower and other "static" elements increases, whereas the length of the rotary kiln decreases.

However, the significant height of the towers reveals problems with sticking and agglomeration of the raw mix in the decarbonatation area. Moreover, such a manufacturing method creates a significant quantity of NOx emissions.

Alternative methods were developed in order to offset these drawbacks, such as the use of fluidized beds or so-called flash calcination, these methods offering unsatisfactory solutions, due to their experimental nature or adjustment difficulty.

Another method consists of using a vertical kiln. Such a method is only marginally used today, given that it is difficult to adjust the atmosphere in the kiln and obtain a uniform clinkerization zone. Indeed, such a kiln is more adapted to low heating temperatures, in the vicinity of 1000° C., whereas clinkerization, in the context of Portland cement, is situated at a temperature in the vicinity of 1450° C., as seen before.

Another manufacturing method is described in document WO 02/94732. This consists of processing the raw mix up to clinkerization through placement in a continuous kiln, such that the raw mix is progressively dried, decarbonated, then clinkerized.

Such a method offers significant operating flexibility, since it is possible to vary the residence time of the raw mix in the clinkerization area. It is also possible to adjust the temperature profile by using a plurality of burners distributed at the crown and side walls of the kiln.

However, the length of the kiln must be significant enough to be able to carry out each of the drying, decarbonatation and clinkerization steps in the same kiln.

The invention aims to resolve the aforementioned drawbacks by proposing a method for manufacturing a sulfoaluminous or belitic sulfoaluminous clinker that is easy to implement, adapted to high clinkerization temperatures, making it possible to master the firing temperature of the raw mix during the production of the clinker, and which is obtained using compact equipment.

To that end, the invention concerns a method for manufacturing a sulfoaluminous or belitic sulfoaluminous clinker from a raw mix formed by a mixture comprising minerals containing calcium, aluminum, silica, iron and sulfur, preferably in sulfate form, characterized in that it includes the steps of:

at least partially dehydrating and decarbonating the mixture through placement in a vertical kiln comprising a substantially vertical chamber wherein the mixture is heated, the chamber of the vertical kiln being supplied with hot gases the temperature of which is between 900 and 1150° C.;

extracting the dehydrated and decarbonated mixture from the vertical kiln and conveying it in a continuous kiln comprising a furnace and a transporting means (6) for transporting the mixture across the furnace;

heating the mixture from the vertical kiln by passing the mixture through the furnace via the transporting means such that a clinkerization of the mixture is obtained, the average passing time in the furnace being greater than 15 minutes.

Thus, the dehydration and decarbonatation of the raw mix are done in the vertical kiln. The dehydrated and decarbonated raw mix is then conveyed into the continuous kiln. Given that only the clinkerization of the raw mix is done in the continuous kiln, the dimensions thereof can be greatly limited compared to the method described in the aforementioned document WO 02/094732.

The use of a continuous kiln offers the advantages previously indicated. In particular, the use of a continuous kiln makes it possible to control the temperature profile during the clinkerization, by adjusting the power of the burners as well as the travel speed of the raw mix in the kiln. The firing temperature of the raw mix can then be controlled with great precision, in the vicinity of 20° C. One thereby guarantees that a maximum temperature causing the appearance of undesired phases and SOx will not be exceeded.

Due to the reduction of the continuous kiln, the dimensions of the overall equipment required to implement the method are reduced. The investments and maintenance costs are therefore also limited.

Moreover, the fuels necessary for the operation of the vertical kiln and continuous kiln are separated.

It is thus possible to use, for the vertical kiln, recovery fuels incompatible with the clinkerization, in particular due to their composition and combustion temperature, and for the continuous kiln, nobler fuels enriched with oxygen, for example.

Moreover, the use of two separate kilns makes it possible to separate the passage speeds in each of the kilns, with a constant flow adapted to the continuous manufacture of clinker. It is possible, for instance, to increase the diameter of the vertical kiln in order to decrease the speed of the raw mix in the vertical kiln. In this way, the dehydration and carbonatation speed, on one hand, and the clinkerization speed on the other can be adjusted independently of each other as a function of the composition of the raw mix or of the clinker to be obtained.

The term "continuous kiln" designates both a tunnel kiln, in which the furnace is substantially rectilinear, and a kiln comprising a circular or ring-shaped furnace and equipped with a moving floor assuming the form of a rotating plate or disc.

Preferably, the average passage time of the mixture in the furnace is between 15 and 40 minutes.

According to one possibility of the invention, the mixture introduced into the vertical kiln assumes the form of pellets, granules or splits.

The pellets or granules can be obtained by agglomeration of filler according to known techniques such as plate balling or granulation. The splits can be obtained by extrusion.

Advantageously, a solid fuel, such as coal or wood, is added to the mixture before said mixture is introduced into the vertical kiln.

In this way, it is possible to reach a raw mix temperature in the vicinity of 950° C. at the base of the vertical kiln, such that the decarbonatation of the raw mix is done completely in the vertical kiln.

The hot gas generator of the vertical kiln can be supplied using recovery gases.

According to another embodiment, the vertical kiln can be supplied in whole or in part using tertiary gases from a clinker cooling device and/or using hot gases from the continuous kiln.

It is thus possible to maintain a vacuum in the vertical kiln so as to aspirate the hot gases from the continuous kiln. The dehydration and decarbonatation of the raw mix can be obtained using only calories contributed by these hot gases, or using additional burners equipping the vertical kiln.

According to one possibility of the invention, the mixture is heated in the vertical kiln, at a temperature between 900° C. and 1100° C.

Preferably, the mixture is heated in the continuous kiln, at a temperature between 1000° C. and 1400° C.

According to one feature of the invention, a reducing or oxidizing atmosphere is created in the furnace of the continuous kiln.

The creation of such an atmosphere is facilitated by the reduced dimensions of the continuous kiln and makes it possible to obtain a clinker that does not lose its mineral properties due to an atmosphere variation.

Advantageously, oxygen is injected into the burners of the furnace of the continuous kiln.

According to one embodiment of the invention, the mixture is conveyed by gravity from the vertical kiln to the transporting means.

According to one possibility of the invention, the mixture coming from the vertical kiln is arranged on a moving floor arranged to move the mixture along the furnace.

The mixture is then no longer supported by rollers, as in document WO 02/094732, but by the moving floor. Material losses, traditionally occurring between the rollers, are thereby reduced.

According to one feature of the invention, the moving floor moves along a closed circuit including a zone for loading the mixture from the vertical kiln, an area for heating the mixture and an area for loading the clinker formed.

The invention also concerns equipment for manufacturing a clinker from a raw mix or mixture, including a vertical kiln comprising a substantially vertical chamber equipped with means for supplying raw mix or mixture, means for heating said mixture, and means (3) for extracting said mixture arranged in the lower portion of the chamber, characterized in that the equipment also includes a continuous kiln comprising a furnace equipped with burners, and transporting means, arranged to collect the mixture coming from the extracting means of the vertical kiln and to transport the mixture through the furnace for an average passage time greater than 15 minutes, so as to clinkerize it, and in that the heating means of the vertical kiln include means for supplying hot gases, the temperature of which is between 900 and 1150° C.

As previously seen, the dimensions of such equipment, and in particular the vertical kiln, can be limited.

According to another feature of the invention, the transporting means includes a moving floor.

Advantageously, the mobile floor is formed by a plurality of carriages mounted on wheels or slewing rollers arranged to move the carriages along the furnace.

According to one possibility of the invention, the moving floor includes a face, designed to be in contact with the mixture, covered with a refractory material.

Preferably, the refractory material is chosen such that it does not react with the mixture to be clinkerized.

According to one embodiment of the invention, the carriages move along a closed circuit including an area for loading of the mixture coming from the vertical kiln, an area for heating the mixture, and an area for unloading the clinker formed.

Preferably, the equipment includes means for injecting oxygen in the burners inside the furnace.

According to one feature of the invention, the extracting means includes an additional moving floor, arranged opposite an outlet orifice arranged in the lower portion of the chamber, such that the dried and decarbonated mixture from the outlet orifice is conveyed by gravity onto the additional moving floor, which, animated by a back-and-forth movement and arranged along a plane that is inclined in relation to the horizontal plane, directs said mixture by gravity toward the transporting means.

Such extracting means enable precise adjustment, depending on the moving floor frequency, of the quantity of mixture conveyed to the transporting means. Moreover, the risks of blockage at the extracting area of the vertical kiln are limited.

Advantageously, the additional moving floor is activated by a cylinder.

According to a first embodiment, the continuous kiln is a tunnel kiln.

According to a second embodiment, the continuous kiln includes a circular or ring-shaped furnace, equipped with a moving floor formed by a rotating plate.

BRIEF DESCRIPTION OF THE DRAWINGS

The invention will be well understood using the following description, in reference to the appended diagrammatic drawing illustrating, as non-limiting examples, several embodiments of the equipment.

DETAILED DESCRIPTION

Figure 1:
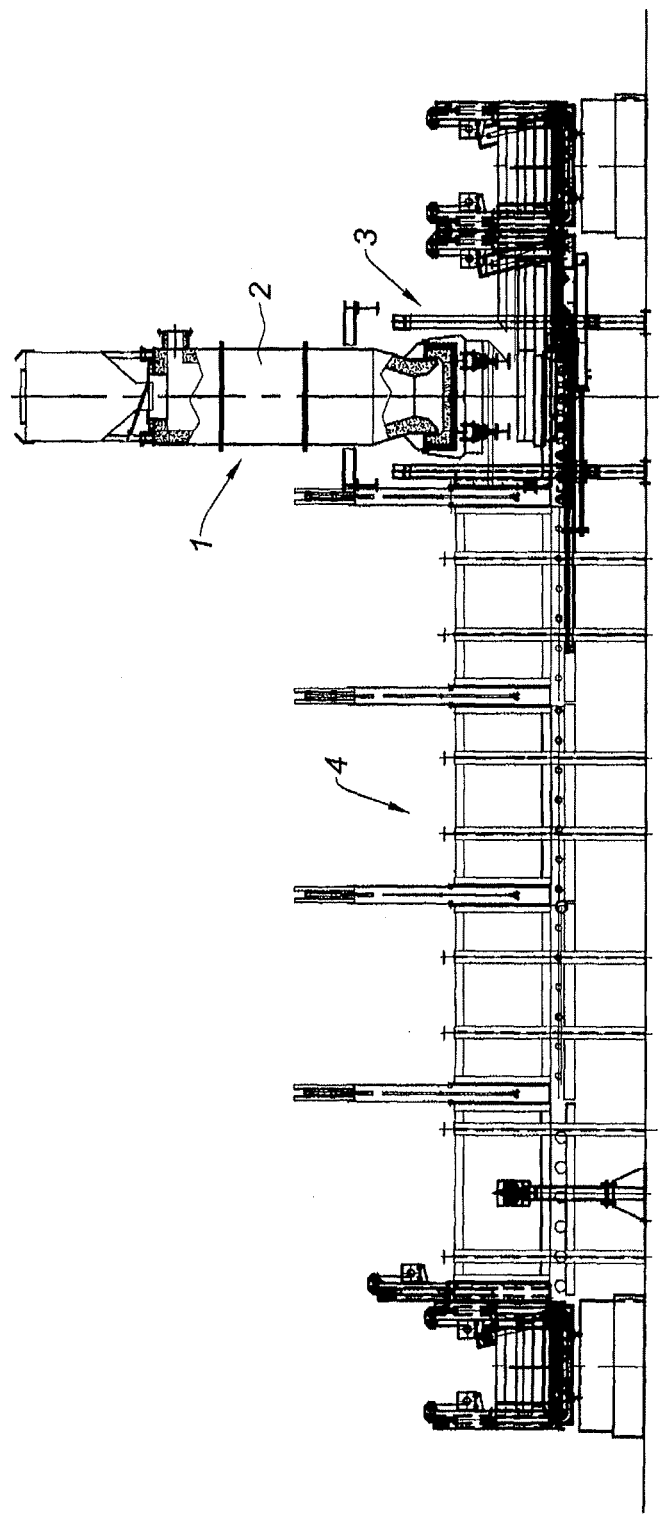
FIG. 1 is a front view.

Equipment for manufacturing a clinker according to the invention is shown in FIG. 1.

This includes a vertical kiln 1 comprising a substantially vertical chamber 2 equipped with means for supplying raw mix or mixture to means for heating said mixture, and means for extracting the mixture 3 arranged in the lower portion of the chamber 2.

The equipment also includes a continuous kiln 4 assuming the form of a tunnel kiln, comprising a furnace 5 equipped with burners, and a transporting means, arranged to collect the mixture from the extracting means 3 of the vertical kiln 1 and to transport the mixture through the furnace 5, so as to clinkerize it.

Figure 2:
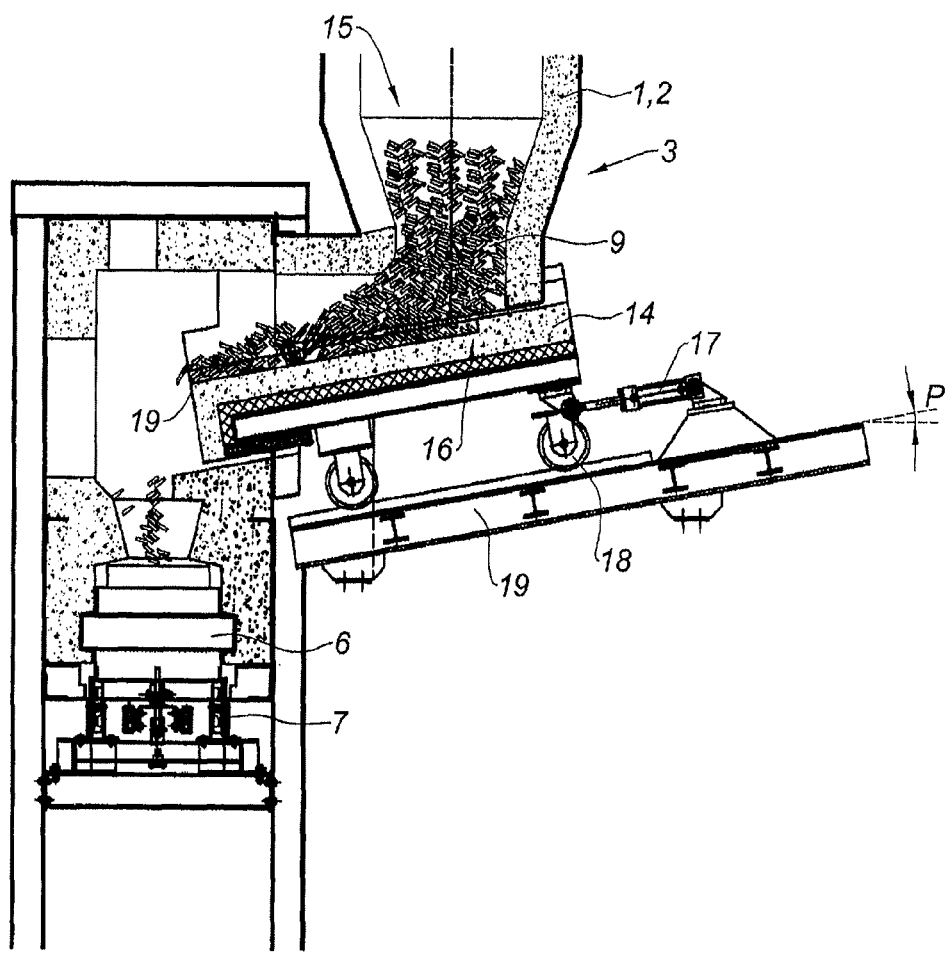
FIG. 2 is an enlarged cross-sectional view of the extraction area of the vertical kiln.
Figure 3:
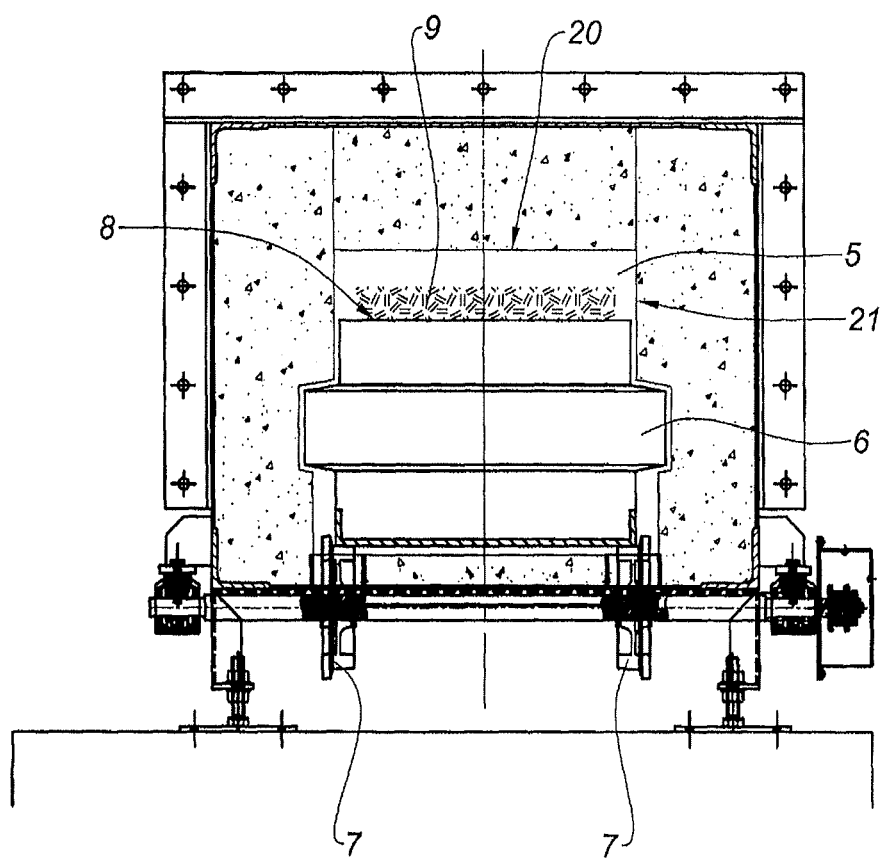
FIG. 3 is a cross-sectional side view of the continuous kiln.

As better shown in FIGS. 2 and 3, the transport means includes a moving floor formed by a plurality of carriages 6 mounted on wheels 7 or slewing rollers arranged to move the carriages 6.

Each carriage 6 includes a face 8, designed to be in contact with the mixture 9, covered with a refractory material.

Figure 5:
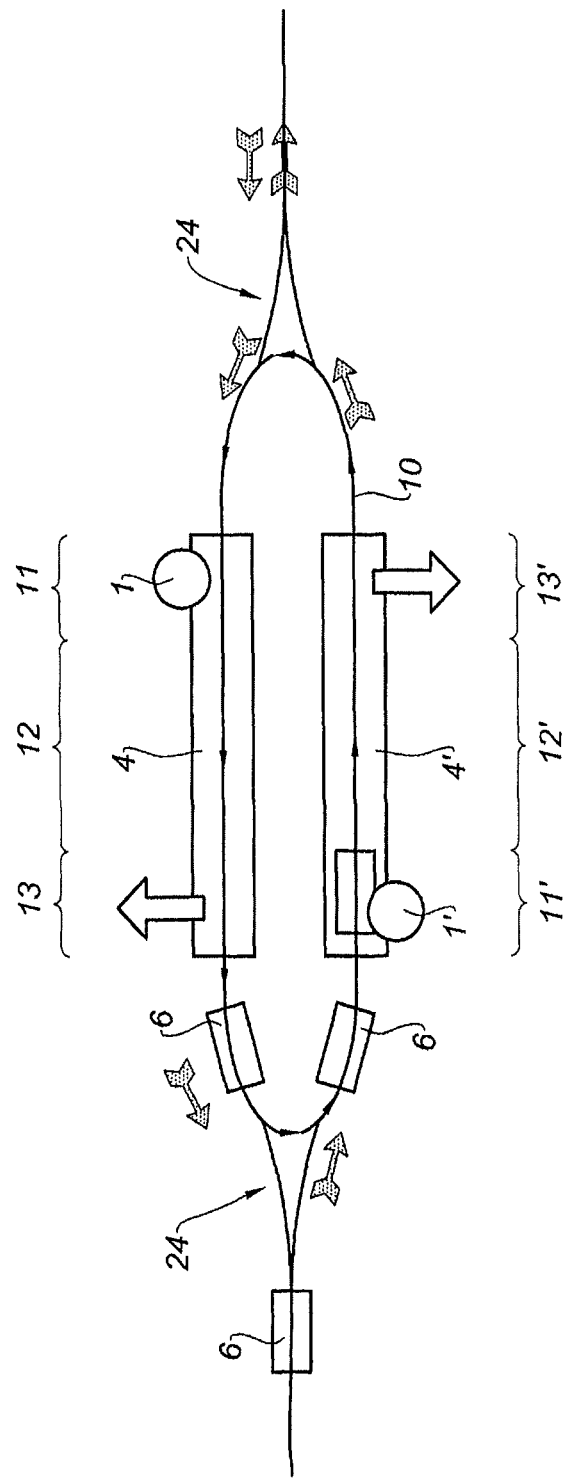
FIG. 5 is a diagrammatic top view illustrating the movement of the carriages.

The carriages 6 move along a closed circuit 10 (FIG. 5) including an area 11 for loading the mixture from the vertical kiln, an area 12 for heating the mixture through placement in the continuous kiln, and an area 13 for unloading the clinker formed.

As shown in FIG. 2, the extracting means 3 includes an additional moving floor 14, arranged opposite an outlet orifice 15 arranged in the lower portion of the chamber 2, such that the dried and decarbonated mixture 9 from the outlet orifice 15 is conveyed by gravity onto the additional moving floor 14.

The additional moving floor 14 has a step 16 at its upper surface. Said step is animated by a back-and-forth movement via a cylinder 17 and wheels 18 mounted on guide rails 19. It is also arranged along a plane P inclined in relation to the horizontal plane.

The additional moving floor 14 thus progressively, by gravity, directs said mixture 9 toward the carriages 6, in particular toward the carriage situated opposite the lower edge 19 of the moving floor 14.

The carriages 6 are thus loaded with mixture 9 as they pass under the extracting means 3, then are conveyed into the furnace 5 of the continuous kiln 4.

The latter comprises a plurality of burners arranged at the crown wall 20 and/or at the side walls 21.

The kiln 4 is also equipped with means for injecting oxygen into the burners, making it possible to create an oxidizing atmosphere in the furnace.

The clinker, after having passed through the heating area 12, is ejected by a back-and-forth system made of refractory material, by a fixed arm made of refractory material, or by a rotating arm making the hot material slide into a connecting goulotte toward the cooler.

Figure 4:
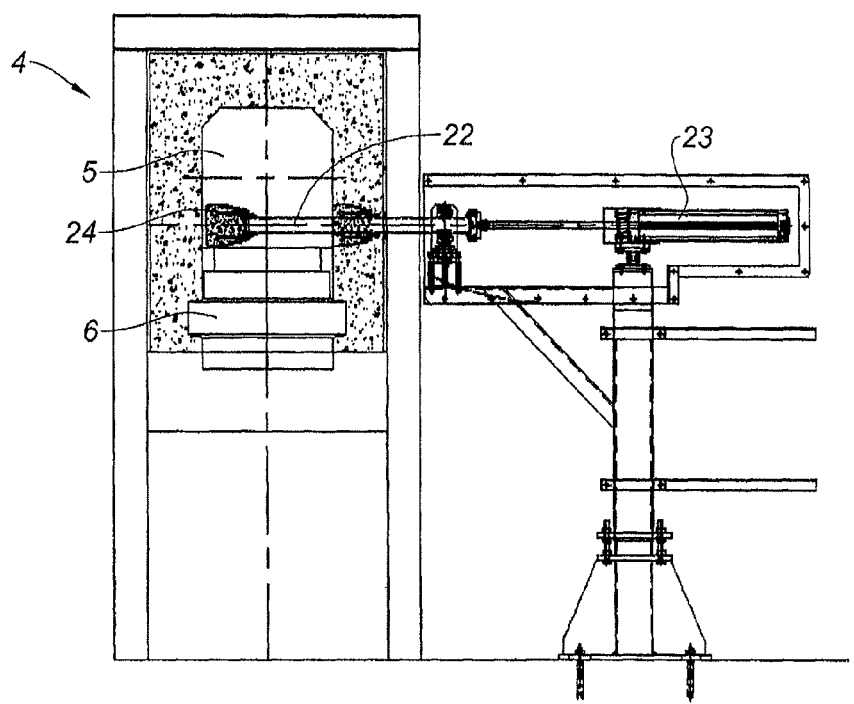
FIG. 4 is a cross-sectional view of the unloading area of the clinker.

FIG. 4 shows an embodiment in which an arm 22 animated by a cylinder 23 includes an end 24 arranged to scrape the surface of the floor so as to remove the clinker. The two extreme positions of the arm 22, corresponding to the in and out positions of the cylinder, are shown in FIG. 4.

The method for manufacturing cement will now be described in more detail.

The raw mix or mixture comprises compounds $CaCO_3$, $Al_2O_3$, and/or $Al(OH)_3$ $CaSO_4$, $SiO_2$, $Fe_2O_3$ and/or a product containing silica or silicates such as clay, all of these compounds being present in anhydrous or hydrated form, individually or in combination.

The mixture 9 introduced into the vertical kiln 1 assumes the form of pellets or granules and/or splits.

According to one embodiment, a solid fuel, such as coal or wood, is added to the mixture before said mixture is introduced into the vertical kiln.

According to another embodiment, the chamber 2 of the vertical kiln 1 is supplied with hot gases, the temperature of which is between 900 and 1150° C. The hot gas generator can for example be supplied using recovery fuels.

According to another embodiment, the vertical kiln 1 can be supplied in whole or in part using tertiary airs coming from a clinker cooling device and/or using hot gases coming from the continuous kiln.

The aim of each of the aforementioned alternatives is to bring the mixture, in the vertical kiln, to a temperature between 900° C. and 1000° C.

Thus, the mixture is progressively dehydrated and decarbonated in the vertical kiln 1.

The vertical kiln 1 is also capable of playing the role of dust removal tower, as it can also trap the sulfur dioxide contained in the fumes.

The mixture is then removed from the vertical kiln 1 by the extracting means 3 described below, conveyed by gravity to the mobile carriages 6, then introduced into the continuous kiln 4.

The burners are arranged to progressively bring the mixture 9 to a clinkerization temperature between 1000° C. and 1400° C. The flame temperature must be significant enough to reduce the clinkerization time and improve the hydraulicity of the clinkers.

The average passage time of the mixture in the furnace of the continuous kiln 4 is between 15 and 40 minutes.

Moreover, the oxidizing atmosphere created in the kiln makes it possible to control the quality and quantity of the hydraulic mineral phases of the clinker.

A large number of products can be clinkerized in this type of kiln; it suffices for the clinkerization reactions to take place in solid phase and for the sticking in the clinkerization area to be industrially acceptable. We will cite only the following examples: belitic sulfoaluminous clinkers with a few percent $C_4A_3\bar{S}$ at more than 95% $C_4A_3\bar{S}$. Clinkers from natural stone to manufacture "quick setting" cements with a base of $C_3A$ and $C_{12}A_7$, belitic clinkers doped to activate the hydration of the belite, and doped "Portland" clinkers, whether or not they clinkerize at a lower temperature.

The clinker thus obtained is unloaded in the unloading area 13 situated downstream from the continuous kiln 3 in the direction of circulation of the carriages 6.

The corresponding carriage 6 is then conveyed again into the loading area 11. For this, it is possible to convey the carriage via an additional continuous kiln making it possible to keep the carriage in temperature, or via a robot conveying the carriage into a heat-isolated chamber.

The return time of the carriage is minimized so as to limit the cooling of the moving floor and to avoid possible degradation of the refractory coating due to a significant temperature deviation.

FIG. 4 diagrammatically illustrates an embodiment in which the carriages move along a closed circuit 10 passing successively through a first unloading area 11, a first continuous kiln 4, a first unloading area 13, then a second loading area 11', a second continuous kiln 4' and a second unloading area 13'.

Switching systems 24 make it possible to convey carriages 6 to or remove them from the circuit 10.

Figures 6, 7:
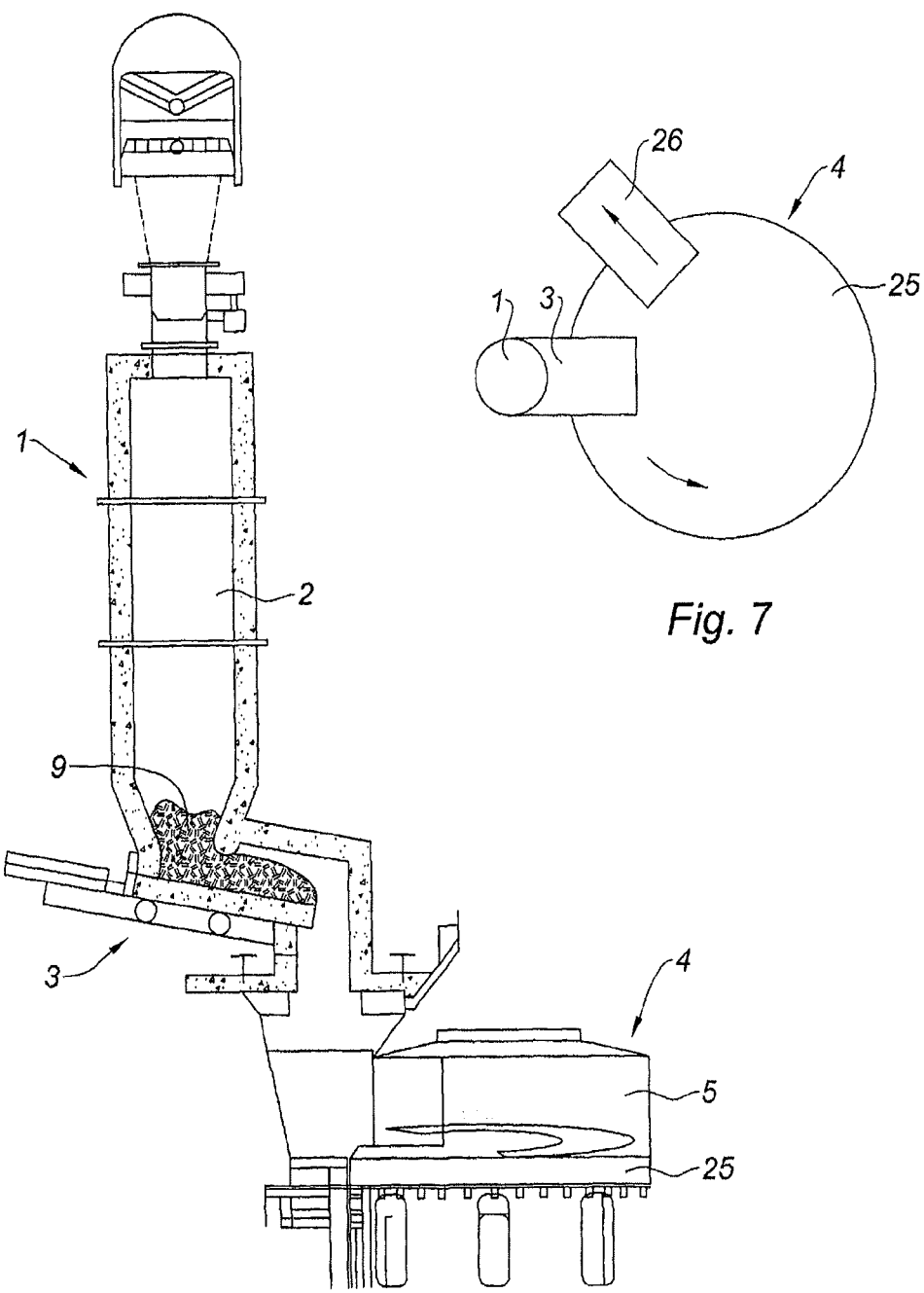
FIG. 6 is a diagrammatic view of equipment according to a second embodiment.
FIG. 7 is a diagrammatic top view of the equipment of FIG. 6.

Another embodiment of the equipment according to the invention is illustrated in FIG. 6.

In this alternative, the vertical kiln 1 is connected to a continuous kiln 4 including a circular or ring-shaped furnace, the mixture 9 being conveyed onto a moving floor assuming the form of a rotating plate or disc 25. In this case, as illustrated in FIG. 7, the means 26 for unloading the clinker is arranged at the periphery of the rotating plate 25.

It goes without saying that the invention is not limited to the embodiments of this equipment and this method, described above as examples, but on the contrary encompasses all alternatives.

The invention claimed is:

1. A method for manufacturing a sulfoaluminous or belitic sulfoaluminous clinker from a raw mix formed by a mixture comprising minerals containing calcium, aluminum, silica, iron and sulfur, comprising:
   at least partially dehydrating and decarbonating the mixture through placement in a vertical kiln comprising a substantially vertical chamber wherein the mixture is heated, the chamber of the vertical kiln being supplied with hot gases the temperature of which is between 900 and 1150° C.;
   extracting the dehydrated and decarbonated mixture from the vertical kiln and conveying the mixture in a continuous kiln comprising a furnace and a transporting means for transporting the mixture across the furnace;
   heating the mixture from the vertical kiln by passing the mixture through the furnace via the transporting means such that a clinkerization of the mixture is obtained, an average passing time in the furnace being greater than 15 minutes.

2. The method according to claim 1, wherein the mixture introduced into the vertical kiln assumes a form of pellets, granules or splits.

3. The method according to claim 1, wherein a solid fuel, such as coal or wood, is added to the mixture, before being introduced into the vertical kiln.

4. The method according to claim 1, wherein the mixture is heated in the vertical kiln, at a temperature between 900° C. and 1100° C.

5. The method according to claim 1, wherein the mixture is heated in the continuous kiln, at a temperature between 1000° C. and 1400° C.

6. The method according to claim 1, wherein a reducing or oxidizing atmosphere is created in the furnace of the continuous kiln.

7. The method according to claim 6, wherein oxygen is injected into burners of the furnace of the continuous kiln.

8. The method according to claim 1, wherein the mixture is conveyed by gravity from the vertical kiln to the transporting means.

9. The method according to claim 1, wherein the mixture from the vertical kiln is arranged on a moving floor arranged to move the mixture along the furnace.

10. The method according to claim 9, wherein the moving floor moves along a closed circuit including an area for loading the mixture from the vertical kiln, an area for heating the mixture and an area for unloading the clinker formed.

11. The method according to claim 1, wherein the mixture comprises minerals containing sulfur in sulfate form.

* * * * *